W. CAVES.
LOAD BINDER.
APPLICATION FILED JUNE 17, 1914.
1,187,887.
Patented June 20, 1916.
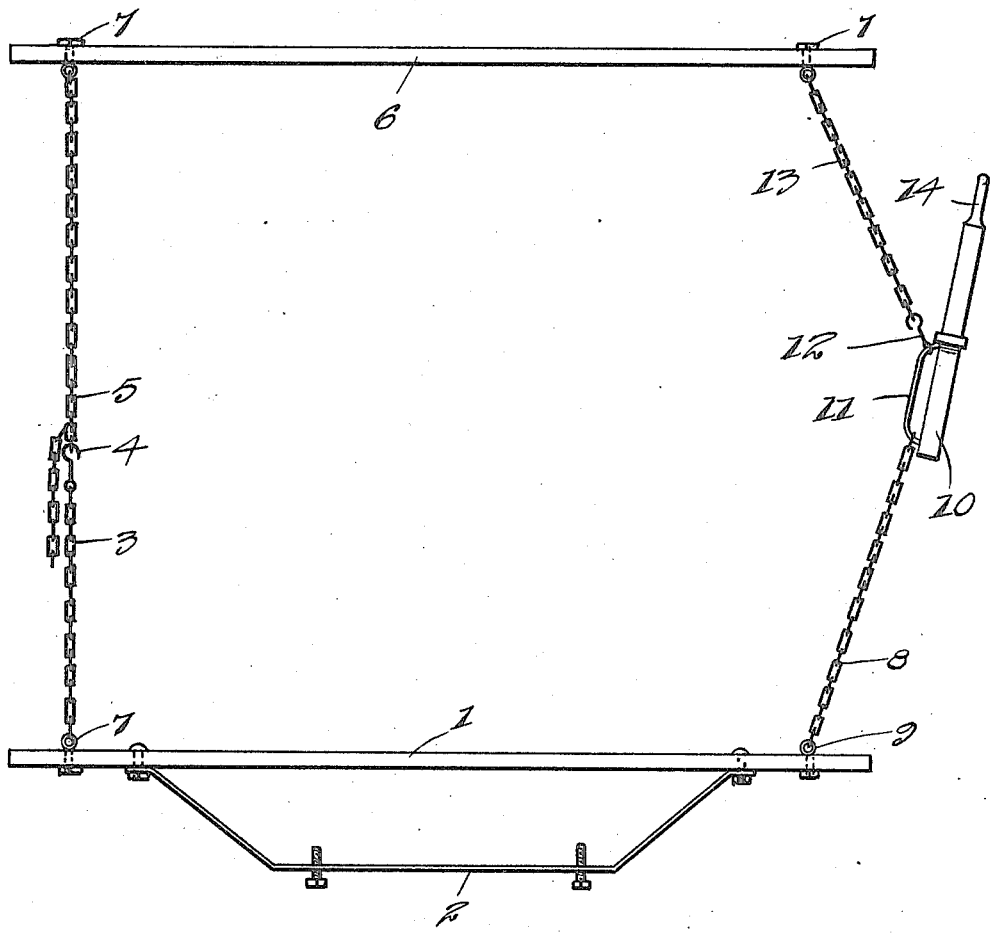
Witnesses
C R Bealle
Rob E Meyer
Inventor
W. Caves.
By
Attorney

UNITED STATES PATENT OFFICE.

WILLIAM CAVES, OF BLACK RIVER FALLS, WISCONSIN.

LOAD-BINDER.

1,187,887. Specification of Letters Patent. Patented June 20, 1916.

Application filed June 17, 1914. Serial No. 845,656.

*To all whom it may concern:*

Be it known that I, WILLIAM CAVES, a citizen of the United States, residing at Black River Falls, in the county of Jackson and State of Wisconsin, have invented certain new and useful Improvements in Load-Binders, of which the following is a specification.

This invention relates to a load binder, and the primary object of the invention is the provision of a device for securely binding a load of lumber or like material upon a wagon, to prevent the dislodgment of the lumber from the wagon during the travel thereof, and to provide a device which will not mar or scar the edges of the lumber.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawing, which shows a side elevation of the improved load binder detached from a wagon, and in describing the invention, similar characters of reference will be used for designating the like or corresponding parts throughout the specification.

Referring more particularly to the drawing, 1 designates the face of the load binder, which has a bracket 2 depending therefrom. The bracket 2 is provided for attaching to the hounds of a wagon (not shown) where the reach (not shown) passes through the hounds.

The base 1 has a chain or flexible member 3 connected to one end thereof, which flexible member has a hook 4 formed upon its free end, which hook is adapted for insertion into or attachment to the flexible member 5, which flexible member is secured to the top strip 6 of the load binder, and depends therefrom. The flexible members or chains 3 and 5 are secured to the top and bottom strips 1 and 6 of the load binder by means of eye bolts 7, or other suitable fastening means.

The base 1 has a flexible member 8 secured thereto, in any suitable manner, by an eye-bolt or other suitable fastening means 9, to the end opposite to the end upon which the flexible member 3 is attached, and the flexible member 8 has a handle 10 connected to its upper free end. The handle 10 has a bracket 11 mounted thereon, to which the flexible member 8 is attached, and which handle has a hook 12 loosely mounted thereupon. The top 6 of the load binder has a flexible member 13 securely connected to the end opposite to the one upon which the flexible member 5 is connected, and this flexible member depends downwardly from the top 6 and is provided for connection with the hook 12 which is mounted upon the bracket 11 of the handle 10.

In the employment or use of the improved load binder, the bracket 2 is securely attached to the hounds (not shown) of a wagon, and the base 1 is positioned so that it comes up level with the front and rear bolsters (not shown) and rests immediately beneath the bottom of the load of lumber which is mounted upon the wagon. After the load has been completed the flexible members 3 and 5 are connected through the hook connection so that the top 6 will rest upon the upper side or top of the load of lumber, and so that the flexible members 3 and 5 will be taut. The handle 10 is then moved manually, so that the hook 12 will be in engagement with one of the links of the chain 13, and the handle is moved outwardly and downwardly, so that the handle grip 14 formed thereon will be positioned downwardly or opposite to the position indicated in the drawing, which downward pull will securely and firmly bind the top board or plate 6 upon the load, and firmly bind the various boards or planks of which the load is formed together, securely holding them upon the wagon and preventing them from slipping or from dislodgment during the travel of the wagon.

In reducing the invention to practice, certain minor features of construction, combination and arrangement of parts may necessitate alteration, to which the patentee is entitled provided such alterations are comprehended within the scope of what is claimed.

What is claimed is:—

A load binder comprising top and bottom plates, eye-bolts detachably secured to said top and bottom plates adjacent their ends, flexible members connected to said eye-bolts, a lever, a bracket attached to said lever, the free end of one of the flexible members carried by said bottom plate being connected to said bracket for sliding movement thereon, a hook slidably mounted upon said bracket and adapted for connection with the free end of one of the flexible members, carried by said top plate, the flexible member carried by said bottom plate which is free from connection to said lever having a hook attached to its free end, said hook being adapted for adjustable connection to the corresponding flexible member carried by said top plate.

In testimony whereof I affix my signature in presence of two witnesses.

WILLIAM CAVES.

Witnesses:
RUFUS A. JONES,
ANNA M. HAUGSTAD.

Copies of this patent may be obtained for five cents each, by addressing the "Commissioner of Patents, Washington, D. C."